3,026,358
PROCESS FOR PREPARING PENTA-CHLORONITROBENZENE

Eugene A. Lojewski, Middleport, N.Y., assignor to Olin Mathieson Chemical Corporation, a corporation of Virginia
No Drawing. Filed Nov. 1, 1961, Ser. No. 149,158
4 Claims. (Cl. 260—646)

This invention relates to the improvements in the manufacture of pentachloronitrobenzene by the chlorination of certain lower chloronitrobenzene starting materials. More particularly, this invention relates to the chlorination of chloronitrobenzenes having 1 to 4 chlorine atoms per molecule, at least one chlorine atom being ortho to the nitro group, to form pentachloronitrobenzene.

Pentachloronitrobenzene is a commercially important fungicide particularly when diluted with suitable carriers. If effectively controls the growth of fungi without damage to plants and is particularly effective against botrytis, fusarium, rhizoctonia and anthracnose. It is useful for the treatment of plant bulbs and the plants themselves. For example, it effectively controls botrytis, rot of gladiolus, blueberries, strawberries, rosebushes, onions, tulips and narcissus, fusarium wilt of carnations and gladiola, rhizoctonia scurf of potatoes and scab of potatoes and radishes. It is also effective for the seed treatment of cotton, lupine and sugar cane and for the treatment of soils in which such plants are grown. It protects cotton seeds from anthracnose, lupine seeds from *Rhizoctonia solani* and sugar cane cuttings from phytophthoral rot.

The German process for the chlorination of nitrobenzene to pentachloronitrobenzene in chlorosulfonic acid as a solvent using iodine as a catalyst is reported in FIAT Report 949. One disadvantage of the German process of chlorination of nitrobenzene is that, even in the presence of iodine as a catalyst and chlorosulfonic acid as a solvent the introduction of chlorine atoms is slow. As the chlorination approaches completion, the substitution of chlorine atoms for hydrogen atoms on the benzene nucleus occurs with greater difficulty, perhaps due to steric effects and decreased charge densities on the benzene nucleus. The proportion of chlorine in the gas introduced which reacts decreases rapidly and near the completion of the chlorination the efficiency of chlorine reaction decreases to as low as 5 percent or less. This means that 95 percent or more of the chlorine introduced passes through the mixture without reaction.

Alternatively, pentachlorobenzene can be nitrated to pentachloronitrobenzene by the use of nitric and sulfuric acids. Because the pentachlorobenzene is so highly substituted, the nitration is slow and difficult. Furthermore, the manufacture of pentachlorobenzene free from lower chlorobenzenes and hexachlorobenzenes is a difficult operation.

The process of the present invention provides a method for the chlorination of chloronitrobenzenes to form pentachloronitrobenzene at an accelerated rate, with improved utilization of the chlorine introduced. It is a surprising feature of this invention that in addition to these advantages, a substantially purer product is obtained than by the previously known processes.

The surprising results of the process of the present invention are obtained using a much more dilute solution of the lower chloronitrobenzenes in chlorosulfonic acid than has previously been used. According to the present invention, the concentration of the lower chloronitrobenzenes in chlorosulfonic acid in the initial charge is in the range of from about 0.5 to 1.5 gram moles and preferably about 0.8 to 1.2 gram moles of the lower chloronitrobenzenes per kilogram of chlorosulfonic acid. In this concentration range the chlorination proceeds more rapidly than with more concentrated solutions and the product can be produced in a purer form. The addition of minor amounts of iodine or ferric chloride as catalyst is optional because its effect is small compared to the improvements obtained by dilution by the chlorination mixture with chlorosulfonic acid. However, its use in proportions of about 0.5 to 1.5 grams per kilogram of chlorosulfonic acid is preferred because of its accelerating effect on the reaction.

The preferred starting material is orthochloronitrobenzene. It is available in ample supply at a reasonable price. It has the advantage over nitrobenzene and other monochloronitrobenzenes as a starting material that one of the positions ortho to the nitro group is already substituted. The intermediate chlorination products of orthochloronitrobenzene, the various dichloro, trichloro, and tetrachloronitrobenzene, having at least one chlorine atom ortho to the nitro group are also suitable starting materials.

In the process of the present invention, the reactor is charged with the lower chloronitrobenzene and chlorosulfonic acid in the ratio of 0.5 to 1.5 gram moles of the former to 1 kilogram of the latter. Chlorine gas is introduced, preferably well distributed into the stirred liquid until the chlorination is substantially complete. The contents of the reactor are removed and worked up to obtain the pentachloronitrobenzene product.

The chlorination temperature is suitably about 50 to 90° C. At higher temperatures the amount of hexachlorobenzene begins to increase markedly and the formation of this by-product is to be avoided. It contaminates the product with inert diluent and represents an unrecoverable loss of the chloronitrobenzene originally charged. At lower temperatures the formation of hexachlorobenzene is largely avoided but the chlorination of certain refractory tetrachloronitrobenzenes is slow. For these reasons, the preferred chlorination temperature is about 55° to 65° C.

The pentachloronitrobenzene is recovered from the reaction mixture by cooling it, preferably to room temperature or below and separating the precipitated pentachloronitrobenzene. Advantageously the temperature is cooled to the range of about 0° to 20° C. by means of ice water. In one method of separation the cooled mixture is filtered through a sintered glass filter using vacuum. However, centrifuging or other suitable means may be used. The filtered solid is advantageously washed with small portions of concentrated sulfuric acid to react with residual chlorosulfonic acid and the filter cake is finally thoroughly washed with water until the acid is removed. The product is dried in any suitable manner, for example, at 50° to 60° C. under a vacuum of 15 to 20 inches of mercury. The pentachloronitrobenzene product is of particularly high quality. It is a light colored, granular, free-flowing solid melting at 145° to 147° C. (The melting point of the pentachloronitrobenzene given in the literature is 146.5° C.)

Among the advantages of the process of the present invention are:

(1) The chlorination mixture is readily filterable at high rates.

(2) Because of the low concentration of reacting lower chloronitrobenzenes in the mixture, temperature is easily controlled.

(3) The product has a high purity and the necessity of recrystallizing is avoided.

(4) The chlorination rate is increased and production capacity of equipment is improved.

(5) The yield of pentachloronitrobenzene is excellent.

Example I

A reactor provided with means for heating, agitation and chlorine inlet and outlet was charged with a mixture of orthochloronitrobenzene and chlorosulfonic acid in the proportion of 1.06 gram moles of the former per kilogram of the latter. As catalyst, 1.06 grams of iodine per kilogram of chlorosulfonic acid was added. Chlorine was introduced, with agitation of the mixture, over a period of five hours. The reaction maintained itself at about 65° C. during the first half of the period and heat was supplied later to maintain that temperature.

The overall increase in weight of the reaction mixture showed that the average rate of chlorination was 7.65 grams of chlorine combining per hour per mole of chloronitrobenzene per kilogram of chlorosulfonic acid.

The reaction mixture was cooled to room temperature and filtered easily. The solid was washed with concentrated sulfuric acid and then with water. It was dried at 70° C. under 25 mm. pressure. The resulting pentachloronitrobenzene melted at 146.5° C. and the yield was 89.6 percent.

Example II

In comparison, a mixture of nitrobenzene and chlorosulfonic acid in the proportion of 4.54 moles of the former per kilogram of the latter was chlorinated with agitation at 60° to 70° C. over a period of 45 hours. As catalyst, 2 grams of iodine was added per kilogram of chlorosulfonic acid. The product, worked up as described in Example I, was obtained in a yield of 91 percent and melted at 140.5 to 142.5° C.

The overall increase in weight of the reaction mixture showed that the average rate of chlorination was 3.92 grams of chlorine combining per hour per mole of chloronitrobenzene per kilogram of chlorosulfonic acid. Thus, the rate of chlorination in the more dilute solution of Example I was nearly twice that of the more concentrated solution of Example II.

What is claimed is:

1. The process for producing pentachloronitrobenzene which consists of chlorinating with elemental chlorine a chloronitrobenzene containing from one to four atoms of chlorine per molecule, at least one of the chlorine atoms being ortho to the nitro substituent, said chloronitrobenzene being mixed with chlorosulfonic acid initially in the proportion of from 0.5 to 1.5 gram moles of the said chloronitrobenzene per kilogram of chlorosulfonic acid.

2. The process of claim 1 in which a minor proportion of iodine is added to the reaction mixture in each stage.

3. The process of claim 1 in which the temperature is maintained between 50° and 90° C.

4. The process of claim 1 in which the chloronitrobenzene is orthochloronitrobenzene.

References Cited in the file of this patent

Thurston: "FIAT Final Report No. 949," October 14, 1946, page 25 relied upon.